United States Patent [19]

Fielder

[11] 4,336,850
[45] Jun. 29, 1982

[54] INTERNAL FLUID SCREEN TO PREVENT NOZZLE AND PORT PLUGGING

[75] Inventor: Coy M. Fielder, Granger, Utah

[73] Assignee: Christensen, Inc., Salt Lake City, Utah

[21] Appl. No.: 186,774

[22] Filed: Sep. 12, 1980

[51] Int. Cl.³ .............................................. E21B 10/60
[52] U.S. Cl. ..................................... 175/393; 175/312
[58] Field of Search ............... 175/393, 339, 340, 320, 175/324, 312

[56] References Cited

U.S. PATENT DOCUMENTS

| | | | |
|---|---|---|---|
| Re. 23,416 | 10/1951 | Kinnear | 175/340 X |
| 2,017,834 | 10/1935 | Hummel | 175/393 |
| 2,549,420 | 4/1951 | Camp | 175/339 X |
| 2,760,758 | 8/1956 | Yancey et al. | 175/393 X |
| 3,131,779 | 5/1964 | Rowley et al. | 175/393 X |

Primary Examiner—Stephen J. Novosad
Assistant Examiner—Joseph Falk
Attorney, Agent, or Firm—Rufus M. Franklin

[57] ABSTRACT

A strainer is shown for use with a downhole tool through which drilling fluid is circulated during the drilling of deep oil wells and the like. The strainer provides a plurality of narrow slots which prevent the passage of material therethrough that might be entrained with the fluid and which otherwise would plug ports or nozzles or restrict flow passages below the strainer.

7 Claims, 4 Drawing Figures

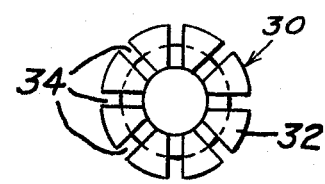
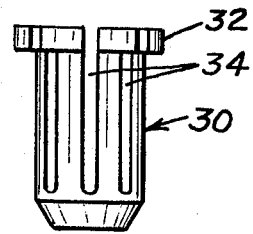
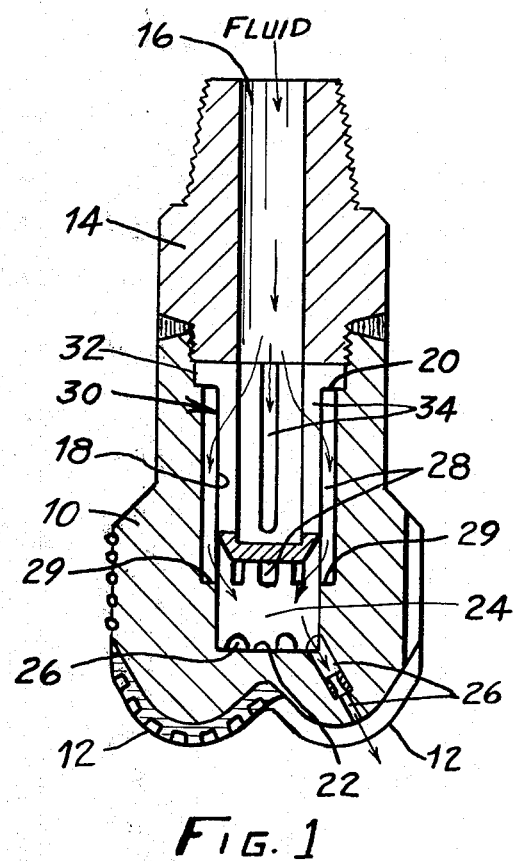
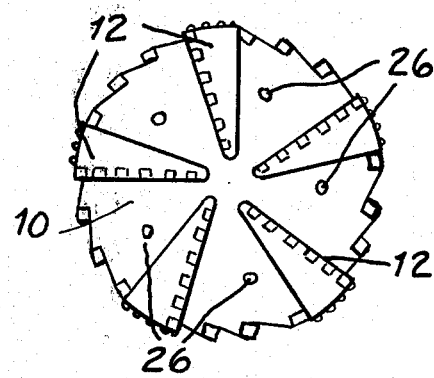

INTERNAL FLUID SCREEN TO PREVENT NOZZLE AND PORT PLUGGING

PRIOR ART

It has been proposed in U.S. Pat. No. 2,880,970 to use a filter made of sintered bronze spheres or bronze powder to form a disc or plate welded to the tool at the entrance from the inner bore of a drilling tool into small passageways carrying fluid to bearings. The discs are described as being mounted at the entrance to the passage in an inclined position with relation to the axis of the bit so that circulation of fluid passing downwardly through the bit will tend to continually scour the surface of the disc to keep it free of filter cake.

A somewhat similar screen means is shown in Canadian Pat. No. 1,033,710 wherein doughnut shaped filters 40 made of a metallic fibre are described. These screens are used to strain the drilling fluid being forced to circulate through a downhole tool in order to allow only clean fluid to enter the bearing cavity while screening out solid particles when flow conditions tend to circulate fluid from the well annulus into the bearing passages.

BRIEF DESCRIPTION OF THE INVENTION

The structure of this strainer makes use of a simply designed cage means made of steel or other erosion resistant material. The cage is fitted closely into a cavity having vertical slots along its wall and the cage is provided with thin slots adapted to be matched with the slots in the wall of the cavity to provide restricted passages through which the fluid is strained and then flows directly to the nozzles or other ports built into the tool for directing the drilling fluid through the tool and into the well. The slots in the cage cooperate with the slots in the wall of the cavity and the cage is spaced from the bottom of the cavity, to provide flow passages through which the strained fluid flows to restricted passages such as nozzles at the bottom of the tool.

The cage is positioned to communicate with the internal flow passage through which drilling fluid is pumped under pressure and feeds the strained fluid to nozzles which direct the fluid against the cutting tools, for example, carried on the outer face of the tool. The slots in the cage present narrow elongated flow passages that cannot easily be clogged by an accumulation of small particles and also permit a large volume of fluid to pass through the strainer while efficiently performing the straining function for which they are designed.

It is therefore the object of this invention to provide a rugged easily constructed efficient strainer for use with downhole tools.

Another object is to provide a simple strainer structure of rugged design to use with a downhole tool.

Another object is to provide a strainer that may be situated close to the restricted outlet passages through which the fluid flows to circulate around the bearings and flow to the jets directed at the cutting edges of the tool.

Other objects will appear from the specification below:

IN THE DRAWINGS

FIG. 1 is a cross-sectional view showing the strainer assembled in a diamond drilling bit;

FIG. 2 is an end view of the cutting end of the bit shown in FIG. 1;

FIG. 3 is a detailed side view of a strainer; and

FIG. 4 is a top view of the strainer element shown in FIG. 3.

DETAILED DESCRIPTION

By way of example, the strainer is here shown mounted in a rotary drill tool having a body 10 that has cutting elements 12 on its outer face. The drill bit is adapted to be mounted at the lower end of a rotary shaft to be driven into the earth.

Drilling fluid is forced down the center of the drill string as is known, to flow from the central bore of the string into the cap 14 of the drill bit. The cap is provided with portions for attachment to the lowest element of the drill string and has central bore 16 communicating with the bore of the drill string to receive the drilling fluid that is circulated under pressure to operate a downhole motor, lubricate and cool the tool and wash the cuttings up and out of the well being drilled.

The body 10 is formed with a central cylindrical cavity 18 having an internal diameter somewhat greater than the internal bore 16 of the cap. The cavity has a shoulder 20 at its upper end and a bottom surface 22 at its lower end. The cylindrical cavity 18, extends downwardly from shoulder 20 to provide a small distribution chamber 24 from which a plurality of restricted flow conduits 26 lead to issue jets of fluid onto the cutting portions of the tool. The side wall of cavity 18 is provided with a plurality of slots 28 that form flow passages for the drilling fluid to pass through the body to flow through the conduits 26, as will appear more fully below.

The angularly spaced slots 28 are of shorter axial length than the cavity and extend to lower shoulders 29 situated at the exit ends of the slots 28 adjoining the chamber 24.

The cavity 18 is adapted to receive a cage 30 having a cylindrical body of a diameter to closely fit within the cavity 18 and a length to leave a space between the bottom of the cage and shoulders 29 at the lower end of the slots 28. The cage has a collar 32 to seat on shoulder 20 and the collar is sealed to the body when cap 14 is assembled on body 10. The cage is also provided with a plurality of narrow passages 34 that may extend through collar 32 and down the wall of the cage substantially to the bottom thereof. When the collar 32 is sealed to the shoulder 20, it is essential that the passages 34 of the cage be positioned over and aligned with slots 28 in the wall of cavity 18 of the body member.

The assembled structure as above described is ready for use and when fluid is pumped down the drill string under pressure, it flows through the bore elements connected to the drill string and then through the bore 16 in cap 14 into cage 30. The fluid then flows through the narrow elongated passages 34 into slots 28. The fluid passes downwardly in these slots to issue into distribution chamber 24 from where the filtered fluid flows through the restricted conduits 26 onto the cutting tools. Any particulate material passing through passages 34 is so small that it will flow through the restricted conduits 26. Should an elongated piece of material flow into the cage that can pass through a passage 34, this material will be vertically aligned with the flow in slot 28 and its bottom end, will land on shoulder 29. Since such a long piece could not pass between the bottom corner of the cage and the edge of the shoulder, it will remain trapped in this position where it cannot flow downwardly to block any of the fluid flow into the restricted conduits 26.

The strainer here shown has elongated narrow passages that have a width to perform the necessary straning function for trapping any particles flowing with the drilling fluid stream, any of which particles might have a diameter that would cause it to clog one of the restricted conduits beyond the strainer. Any elongated slender fibre that might be aligned with one of the passages in the strainer and be carried through it by the fluid flow, becomes trapped in a slot 28 and on shoulder 29 as explained above. The elongated passages 34, although narrow to provide the desired straining action, provide an amply large flow passage to present no substantial impediment to the flow of fluid through the cage on its way to the surfaces of the tool to which it is directed by the conduits 26 communicating with the distribution chamber 24 immediately downstream from the strainer means.

The above describes a preferred use of this invention in one form of a drill bit having diamond compact cutting elements secured to its face. It is possible that other applications will be found for this strainer on other tools such as diamond drills driven by downhole motors and possibley on other devices where restricted flow passages must be kept clear in downhole locations where circulation of drilling fluid through such passages is critical to the successful continued operation of the tool under very severe conditions.

Many of such modifications of this invention may fall within the scope of the following claims.

What is claimed is:

1. A strainer for use with a rotary drill bit for deep holes in shales, sandstone, conglomerate, coal and the like wherein the tool is mounted to be rotatably driven at the downhole end of a drill string through which a fluid is circulated, comprising a body having an outerface, said body having an internal cavity to receive the fluid, said cavity being defined by a side wall, said cavity having an end wall with restricted flow passages leading from said cavity to the outer face of the body through which said fluid flows, said sidewall of said cavity having a plurality of slots formed therin, a screen element in the form of a hollow cage having side and bottom walls shaped to fit within said cavity to be closely fitted to said side wall of the cavity with its bottom wall spaced from said end wall of the cavity, said screen having a plurality of elongated narow passages cooperating with said slots adapted to strain fluid cut through its sidewall, and means to hold said screen in said cavity with its passages aligned with said slots in the side wall of the cavity whereby drilling fluid may flow to said tool to be screened in said tool body through said slots and passages before it passes to said restricted flow passages.

2. A strainer for use with a tool as in claim 1 wherein said cavity has a circular cross-section.

3. A strainer for use with a tool as in claim 1 wherein said cavity is cylindrical.

4. A strainer for use with a rotary tool as in claim 3 wherein said body has an elongated shank portion above its outer face, said cavity being formed in said shank, and said cage being supported by said shank portion to substantially fill said cavity whereby said matching passages and slots and said bottom of the cage spaced from said end wall constitute the screening means positioned immediately adjacent the restricted conduits through which fluid flows to the outer face of the tool.

5. A strainer for use with a rotary tool as in claim 4 wherein the tool is a drill, said drill having cutting elements secured to its outerface, and said restricted conduits feed fluid to nozzles to direct fluid to said cutting elements while the tool is working.

6. A strainer for use with a rotary tool as in claim 5 wherein said shank has a bearing shoulder formed in said cavity, said cage has a bearing collar integral therewith adapted to be seated on said shoulder, and a cap for said body for securing said collar on said shoulder.

7. A strainer for use with a rotary tool as in claim 4 wherein a distribution chamber of smaller diameter than said internal cavity is disposed at the bottom end of the internal cavity, and a shoulder that is spaced from the bottom of said cage defines said distribution chamber.

* * * * *